J. CRELLIN.
Horse Hay Rake.
No. 47,703.
Patented May 16, 1865.
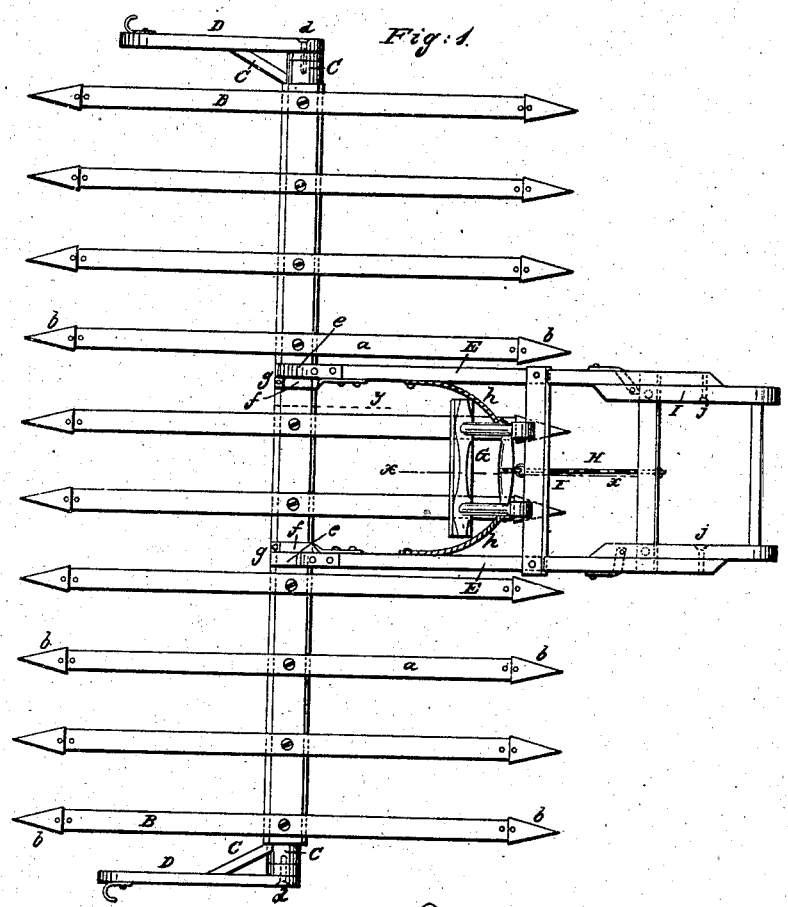
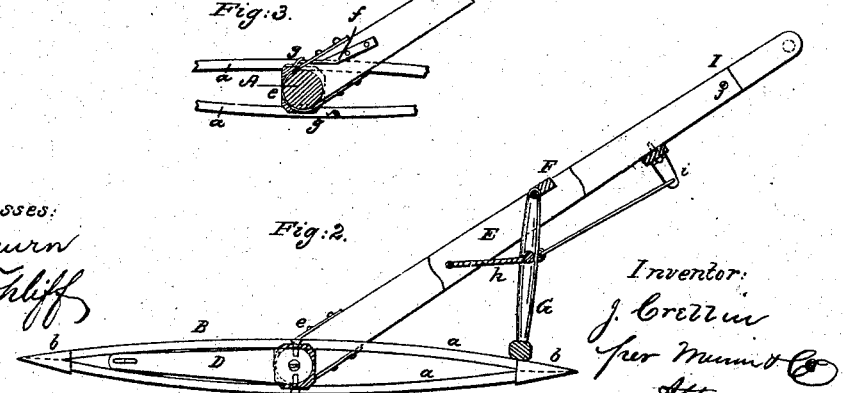
Witnesses:
Wm Treurn
C. L. Topliff
Inventor:
J. Crellin
per Munn & Co
Attorneys.

UNITED STATES PATENT OFFICE.

J. CRELLIN, OF MARSHALLTOWN, IOWA.

IMPROVEMENT IN HORSE HAY-RAKES.

Specification forming part of Letters Patent No. 47,703, dated May 16, 1865.

*To all whom it may concern:*

Be it known that I, J. CRELLIN, of Marshalltown, in the county of Marshall and State of Iowa, have invented a new and Improved Horse Hay-Rake; and I do hereby declare that the following is a full, clear, and exact description thereof, which will enable those skilled in the art to make and use the same, reference being had to the accompanying drawings, forming part of this specification, in which—

Figure 1 is a plan or top view of my invention; Fig. 2, a side sectional view of the same taken in the line $x\ x$, Fig 1; Fig. 3, a transverse section of a portion of the same taken in the line $y\ y$ of Fig. 1.

Similar letters of reference indicate like parts.

This invention relates to a new and improved horse hay-rake; and it consists in a peculiar construction of the teeth and an improvement in the draft-pieces, and also in the mechanism employed for holding the rake in working position and liberating the same, in order that it may discharge its load, whereby it is believed that several advantages are obtained over the generality of rakes now in use.

A represents the head of the rake, and B the teeth attached thereto. These teeth are each constructed of two parts, $a\ a$, of a suitable hard wood, said pieces being secured by bolts or screws to opposite sides of the head A, and having their ends connected together by metal tips $b$, as clearly shown in Figs. 2 and 3. By this mode of construction a very strong and economical rake-tooth is obtained. The teeth, as is usual in rakes of this class, project at equal distances from opposite sides of the rake-head, and the metal tips $b$ may be secured by nails or screws on the ends of the teeth, said tips preserving the ends of the teeth from wear, as well as keeping the ends of the two parts $a\ a$ in contact.

At each end of the rake-head A there is a cylindrical portion, $c$, to serve as bearings for braces C, which project obliquely from draft-bars D D, the latter being attached by screws $d$ to the ends of the rake-head. The braces C serve to retain or hold the draft-bars D in proper position, preserving them from all undue lateral strain to which they would otherwise be subjected under the pull or draft of the animal or team. The back ends of the braces are hollowed out in semicircular form, so as to fit snugly to the bearings $c$.

E E represent two parallel bars, which are connected by a cross-piece, F. The front and lower ends of these bars are connected by metal straps $e\ e$ to the rake-head A, said straps being fitted on cylindrical portions of the rake-head to admit of the latter turning freely in them. Each bar E has a spring-bar, $f$, attached to it, at its inner side, near the rake-head, and against these springs lips or projections $g$ on the rake-head bear, the springs $f$ serving as stops. The bars E, and consequently the springs, are retained in proper position relatively with the lips or projections $g$ by means of a pendent swinging frame, G, $g$ connected with the cross-piece F of the bars E E, said frame resting or bearing on the rear part of two of the teeth B of the rake. This pendent frame G has two spiral springs, $h\ h$, attached to it, one at each side, said springs extending from the bars E E, and having a tendency to keep the frame G over the teeth B, as shown more particularly in Fig. 2. This frame G is connected by a rod, H, with an arm, $i$, extending from a frame, I, which is connected to the outer ends of the bars E E by pivots $j\ j$.

As the machine is drawn along, the hay or grain is raked or gathered on the front part of the teeth B, and the load is discharged at at any time by the attendant or driver shoving forward the upper end of frame I, the lower end of which, in consequence of being connected to the frame G by the rod H, draws the frame G backward off from the teeth B, and admits of the rake under the draft movement making a half-revolution; the lips or projections $g$, at the opposite side of the rake-head, engaging with or bearing against the springs $f$, and the frame I being released, so that the springs $h\ h$ may draw the lower end of the frame G over the teeth B to hold the rake in proper working position.

I claim as new and desire to secure by Letters Patent—

1. The constructing of the teeth of two longitudinal parts, $a\ a$, attached to opposite sides of the rake-head A, and connected at their ends by metal tips $b$, substantially as described.

2. The oblique braces C, attached to the draft-bars D, and arranged to rest or bear upon the cylindrical portions c of the rake-head A, as set forth.

3. The arrangement and combination of the frame I, pivoted to the outer parts of the bars E E, and the pendent frame G, the two frames aforesaid being connected by a rod, H, and the frame G connected by springs h h with the bars E E, substantially as and for the purpose set forth.

JOHN CRELLIN.

Witnesses:
L. W. GRISWOLD,
B. W. JOHNSON.